(12) United States Patent
Uehara

(10) Patent No.: US 10,439,498 B2
(45) Date of Patent: Oct. 8, 2019

(54) BOOST CONVERTER

(71) Applicant: Toyota Jidosha Kabushiki Kaisha, Toyota-shi, Aichi-ken (JP)

(72) Inventor: Manabu Uehara, Miyoshi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/284,639

(22) Filed: Feb. 25, 2019

(65) Prior Publication Data

US 2019/0267900 A1   Aug. 29, 2019

(30) Foreign Application Priority Data

Feb. 26, 2018   (JP) .................................. 2018-032392

(51) Int. Cl.
*H02M 3/158* (2006.01)
*H02P 27/06* (2006.01)
*H02M 1/00* (2006.01)

(52) U.S. Cl.
CPC .... *H02M 3/1584* (2013.01); *H02M 2001/007* (2013.01); *H02M 2001/0074* (2013.01); *H02M 2001/0077* (2013.01); *H02M 2003/1586* (2013.01); *H02P 27/06* (2013.01)

(58) Field of Classification Search
CPC ... H02M 2001/007; H02M 2001/0074; H02M 2001/0077; H02M 3/1584; H02M 2003/1586
USPC ......................................... 323/271, 272, 274
See application file for complete search history.

(56) References Cited

U.S. PATENT DOCUMENTS

| 7,535,204 | B1* | 5/2009 | Nadimpalli | H02M 3/1584 323/222 |
| 7,576,521 | B2* | 8/2009 | Komiya | H02M 1/36 323/268 |
| 2008/0157742 | A1* | 7/2008 | Martin | H02M 3/1584 323/284 |
| 2014/0145697 | A1* | 5/2014 | Manabe | H02M 3/1584 323/283 |

FOREIGN PATENT DOCUMENTS

JP   2016-127765 A   7/2016

* cited by examiner

*Primary Examiner* — Gary A Nash
(74) *Attorney, Agent, or Firm* — Dinsmore & Shohl LLP

(57) ABSTRACT

A boost converter disclosed herein may include boost circuits including: a diode including a cathode connected to a high-potential output wiring; a switching element including a terminal connected to an anode of the diode and a terminal connected to a low-potential wiring; and a reactor connected between the high-potential input wiring and the anode. A control circuit may energize, in a first operation, a first boost circuit when charge current is in a first range, and energize the first and a second boost circuits when the charge current is in a second range larger than the first range. The control circuit may energize, in a second operation, a third boost circuit when the charge current is in the first range, and energize the third and a fourth boost circuits when the charge current is in the second range. The first boost circuit is other than the third boost circuit.

7 Claims, 4 Drawing Sheets

FIG. 4

| Operation | I1 | Boost Circuit to be Energized | | | |
|---|---|---|---|---|---|
| A | I1 < Ith1 | U | | | |
| | Ith1 ≤ I1 < Ith2 | U | W | | |
| | Ith2 ≤ I1 < Ith3 | U | W | V | |
| | Ith3 ≤ I1 | U | W | V | X |
| B | I1 < Ith1 | W | | | |
| | Ith1 ≤ I1 < Ith2 | W | U | | |
| | Ith2 ≤ I1 < Ith3 | W | U | X | |
| | Ith3 ≤ I1 | W | U | X | V |
| C | I1 < Ith1 | V | | | |
| | Ith1 ≤ I1 < Ith2 | V | X | | |
| | Ith2 ≤ I1 < Ith3 | V | X | U | |
| | Ith3 ≤ I1 | V | X | U | W |
| D | I1 < Ith1 | X | | | |
| | Ith1 ≤ I1 < Ith2 | X | V | | |
| | Ith2 ≤ I1 < Ith3 | X | V | W | |
| | Ith3 ≤ I1 | X | V | W | U |

BOOST CONVERTER

CROSS-REFERENCE TO RELATED APPLICATIONS

This application claims priority to Japanese Patent Application No. 2018-032392 filed on Feb. 26, 2018, the contents of which are hereby incorporated by reference into the present application.

TECHNICAL FIELD

A technology disclosed herein relates to a boost converter.

BACKGROUND

Japanese Patent Application Publication No. 2016-127765 describes an inverter device that includes a first inverter and a second inverter. This inverter device changes a number of inverters to be energized, in accordance with output power. In other words, the inverter device energizes only the first inverter and does not energize the second inverter when output power is low, and energizes both of the first inverter and the second inverter when output power is high. Changing the number of inverters to be energized as such improves power conversion efficiency.

SUMMARY

The inverter device in Japanese Patent Application Publication No. 2016-127765 constantly energizes the first inverter, so a switching element of the first inverter bears a heavier load, and thus the switching element of the first inverter deteriorates earlier than a switching element of the second inverter. Moreover, Japanese Patent Application Publication No. 2016-127765 does not consider a boost converter. The disclosure herein provides a technology capable of changing a number of boost circuits to be energized, and capable of suppressing a load from being disproportionately imposed on a switching element in a specific boost circuit, in a boost converter.

A boost converter disclosed herein may be configured to boost voltage supplied from a power source. This boost converter may comprise: a high-potential input wiring connected to a positive electrode of the power source; a low-potential wiring connected to a negative electrode of the power source; a high-potential output wiring; a capacitor connected between the high-potential output wiring and the low-potential wiring; a plurality of boost circuits; and a control circuit. Each of the plurality of boost circuits may comprise: a diode, a cathode of the diode being connected to the high-potential output wiring; a switching element comprising a first main terminal connected to an anode of the diode, a second main terminal connected to the low-potential wiring, and a gate; and a reactor connected between the high-potential input wiring and the anode of the diode. The control circuit may be connected to the gates of the switching elements of the plurality of boost circuits. The control circuit may be configured to be capable of performing a first operation and a second operation. The control circuit may be configured, in each of the first operation and the second operation, to increase a number of the boost circuits to be energized as charge current charging the capacitor is larger. The control circuit may be configured, in the first operation, to energize a first boost circuit of the plurality of boost circuits when the charge current is in a first range, and energize the first boost circuit and a second boost circuit of the plurality of boost circuits when the charge current is in a second range, the charge current in the second range being larger than the charge current in the first range. The control circuit may be configured, in the second operation, to energize a third boost circuit of the plurality of boost circuits when the charge current is in the first range, and energize the third boost circuit and a fourth boost circuit of the plurality of boost circuits when the charge current is in the second range. The first boost circuit may be one of the plurality of boost circuits other than the third boost circuit.

In the disclosure herein, energizing a boost circuit means allowing current to flow in a reactor, a diode, and a switching element in the boost circuit by repeatedly switching the switching element in the boost circuit. Moreover, "the charge current in the second range being larger than the charge current in the first range" described above means that a lower limit of the second range is larger than an upper limit of the first range.

This boost converter is configured to boost a potential of the high-potential input wiring, and output the boosted potential to the high-potential output wiring. The boost converter is configured to be capable of performing the first operation and the second operation, and increases the number of the boost circuits to be energized as the charge current charging the capacitor is larger, in each of the first operation and the second operation. The boost converter can therefore achieve highly efficient boosting in each of the first operation and the second operation.

In the first operation, current flows in the first boost circuit irrespective of whether the charge current is in the first range or in the second range. In other words, in the first operation, the switching element in the first boost circuit bears a high load. In the second operation, on the other hand, current flows in the third boost circuit irrespective of whether the charge current is in the first range or in the second range. In other words, in the second operation, the switching element in the third boost circuit bears a high load. The first boost circuit is a circuit other than the third boost circuit. Therefore, the switching element that bears a high load in the first operation differs from the switching element that bears a high load in the second operation. As such, by making different switching elements bear a high load in the first operation and in the second operation, a specific switching element can be suppressed from deteriorating earlier than another switching element. Consequently, reliability of the boost converter can be improved.

BRIEF DESCRIPTION OF DRAWINGS

FIG. 4 is a diagram that shows boost circuit(s) to be energized in each operation.

DETAILED DESCRIPTION

Figure 1:
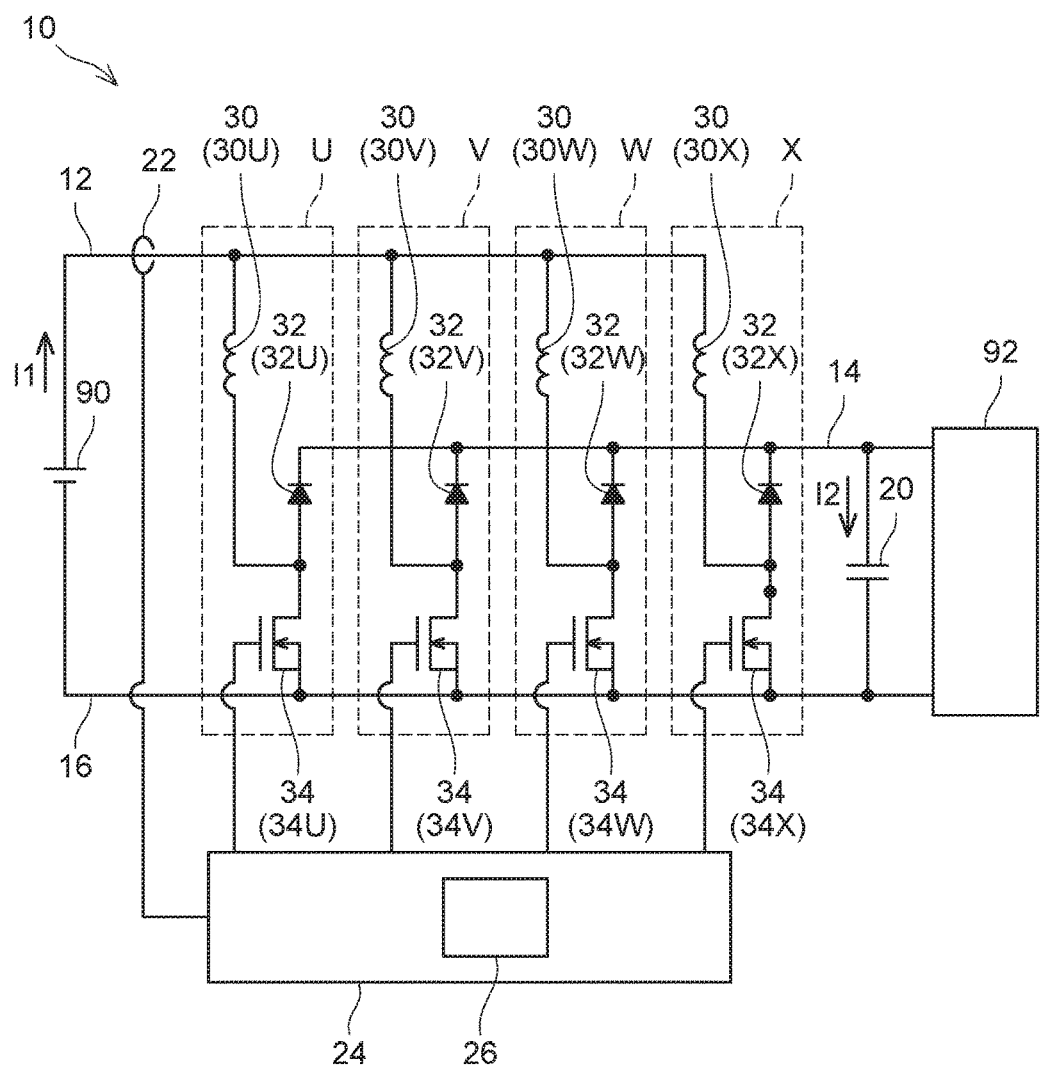
FIG. 1 is a circuit diagram of a boost converter.

A boost converter 10 in an embodiment shown in FIG. 1 is mounted on a vehicle provided with a traction motor (e.g., an electric vehicle, a hybrid vehicle, a fuel-cell vehicle, and the like), and is configured to supply power to the traction motor. The boost converter 10 is connected between a power source 90 and a load circuit 92. The power source 90 is a direct current power source such as a battery, a fuel cell, or the like. Although not shown, the load circuit 92 includes an inverter and the traction motor. The boost converter 10 is configured to boost voltage supplied from the power source 90, and supply the boosted voltage to the inverter of the load circuit 92. The inverter converts the direct current power supplied from the boost converter 10 into alternating current power, and supplies the alternating current power to the traction motor.

The boost converter 10 includes a high-potential input wiring 12, a high-potential output wiring 14, a low-potential wiring 16, a boost circuit U, a boost circuit V, a boost circuit W, a boost circuit X, a capacitor 20, a current sensor 22, and a control substrate 24.

The high-potential input wiring 12 is connected to a positive electrode of the power source 90. The low-potential wiring 16 is connected to a negative electrode of the power source 90. Moreover, the low-potential wiring 16 is connected to the load circuit 92. The high-potential output wiring 14 is connected to the load circuit 92. Each of the boost circuits U, V, W, X is connected to the high-potential input wiring 12, the high-potential output wiring 14, and the low-potential wiring 16. Each of the boost circuits U, V, W, X includes a reactor 30, a diode 32, and a switching element 34.

The boost circuits U, V, W, X are identical to one another in their configurations, and hence the configuration of the boost circuit U will hereinafter be described. In the present embodiment, the switching element 34 is constituted of a metal oxide semiconductor field effect transistor (MOS-FET). It should be noted that another switching element such as an insulated gate bipolar transistor (IGBT) may be used as the switching element 34. The switching element 34 has its source connected to the low-potential wiring 16. The switching element 34 has its drain connected to an anode of the diode 32. The switching element 34 has its gate connected to the control substrate 24. The diode 32 has its cathode connected to the high-potential output wiring 14. The reactor 30 has its one end connected to the anode of the diode 32 and the drain of the switching element 34. The reactor 30 has the other end connected to the high-potential input wiring 12. In other words, the reactor 30 is connected between the high-potential input wiring 12 and the anode of the diode 32.

Figure 2:
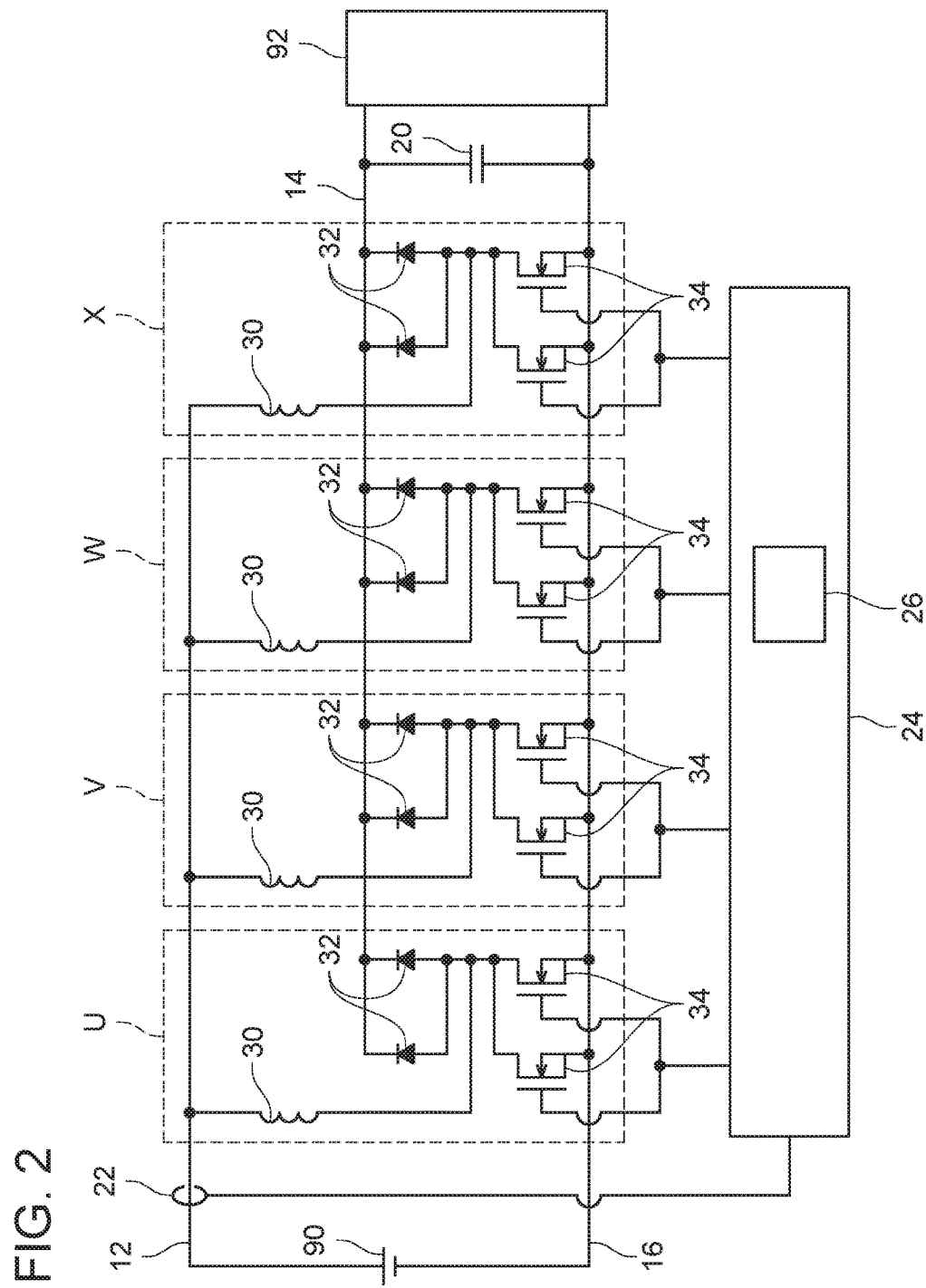
FIG. 2 is a circuit diagram of a boost converter.

Although each of the boost circuits includes one switching element 34 in FIG. 1, each of the boost circuits may include a plurality of switching elements 34 connected in parallel as shown in FIG. 2. In FIG. 2, a common signal is inputted into the gates of the plurality of switching elements 34 connected in parallel. In the configuration in FIG. 2, the plurality of switching elements 34 substantially functions as one switching element. Moreover, although each of the boost circuits includes one diode 32 in FIG. 1, each of the boost circuits may include a plurality of diodes 32 connected in parallel as shown in FIG. 2. In the configuration in FIG. 2, the plurality of diodes 32 connected in parallel substantially functions as one diode. The circuit in FIG. 2 is substantially equivalent to the circuit in FIG. 1. Therefore, the description will hereinafter be made based on FIG. 1.

In the following description, the reactor 30, the diode 32, and the switching element 34 in the boost circuit U will be called a reactor 30U, a diode 32U, and a switching element 34U, respectively; the reactor 30, the diode 32, and the switching element 34 in the boost circuit V will be called a reactor 30V, a diode 32V, and a switching element 34V, respectively; the reactor 30, the diode 32, and the switching element 34 in the boost circuit W will be called a reactor 30W, a diode 32W, and a switching element 34W, respectively; and the reactor 30, the diode 32, and the switching element 34 in the boost circuit X will be called a reactor 30X, a diode 32X, and a switching element 34X, respectively.

The capacitor 20 is connected between the high-potential output wiring 14 and the low-potential wiring 16.

The current sensor 22 detects current I1 that flows from the power source 90 to the high-potential input wiring 12. A value detected by the current sensor 22 is transmitted to the control substrate 24.

The control substrate 24 is connected to each of the gates of the switching elements 34U, 34V, 34W, 34X. The control substrate 24 switches the switching elements 34U, 34V, 34W, 34X by controlling potentials of their gates. The control substrate 24 includes a microcomputer 26. The microcomputer 26 stores a method of operating each of the boost circuits.

Figure 3:
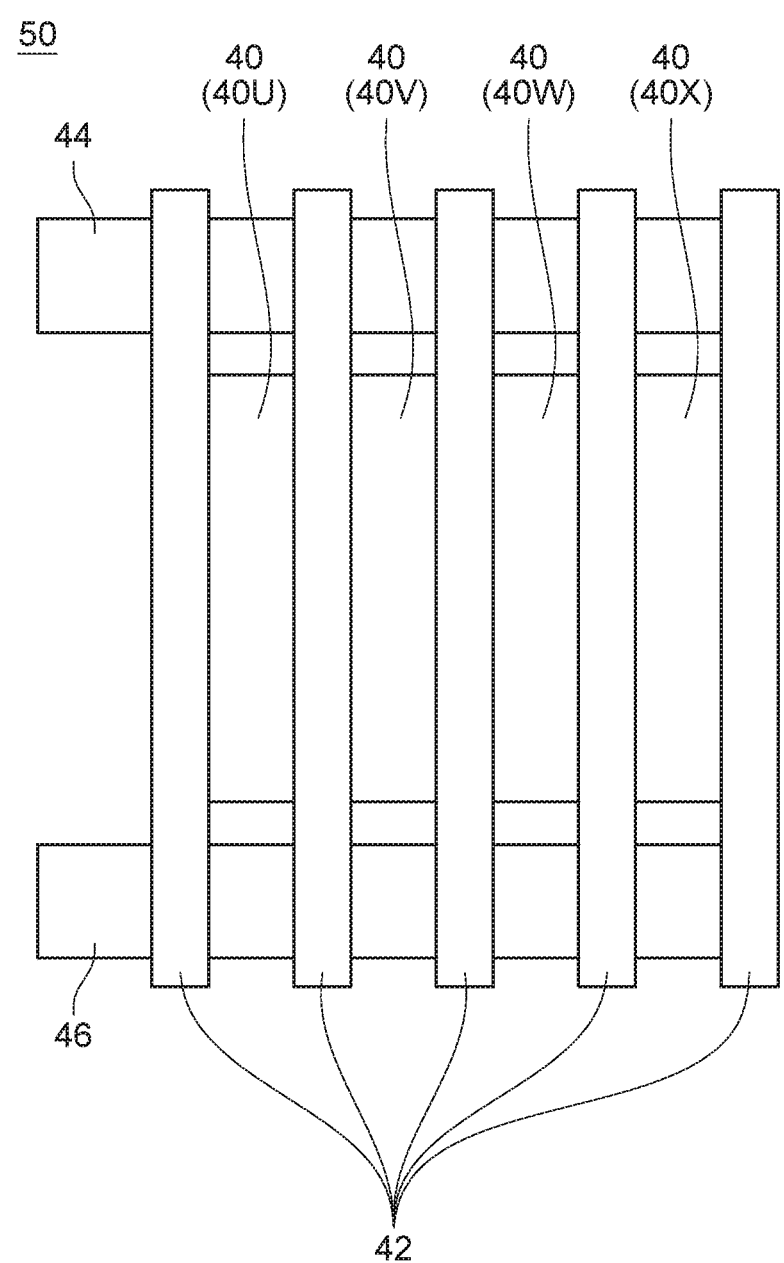
FIG. 3 is a plan view of a power control unit.

FIG. 3 shows a power control unit 50. The power control unit 50 includes a structure in which a plurality of switching modules 40 is stacked. The switching element 34 and the diode 32 in each of the boost circuits are housed in corresponding one of the switching modules 40. Each of the switching modules 40 is a component in which the switching element 34 and the diode 32 are configured integrally by being sealed with insulating resin. A switching module 40U houses the switching element 34U and the diode 32U. A switching module 40V houses the switching element 34V and the diode 32V. A switching module 40W houses the switching element 34W and the diode 32W. A switching module 40X houses the switching element 34X and the diode 32X. The switching modules 40U, 40V, 40W, 40X are arranged in line in this order. The switching modules 40U, 40V, 40W, 40X are stacked in their thickness directions. Cooling plates 42 are disposed to be in contact with the switching modules 40, respectively. The switching modules 40 and the cooling plates 42 are alternately stacked. Due to this, each of the switching modules 40 is interposed between two of the cooling plates 42. The cooling plates 42 are connected to one another by cooling pipes 44, 46. Each of the cooling plates 42 is internally provided with a coolant passage. Coolant flows from the cooling pipe 44 to the cooling pipe 46 through the coolant passage in each of the cooling plates 42. The coolant cools each of the cooling plates 42. The cooling plates 42 cool the switching modules 40.

Next, a boosting operation of each of the boost circuits will be described. Since the boost circuits U, V, W, X are identical to one another in their boosting operations, the boosting operation of the boost circuit U will herein be described. The switching element 34U is switched by the control substrate 24 controlling a potential of the gate of the switching element 34U. The switching element 34U is turned off when the potential of the gate becomes less than a gate threshold, and the switching element 34U is turned on when the potential of the gate becomes equal to or greater than the gate threshold. The control substrate 24 controls the switching element 34U such that the switching element 34U is periodically brought into an on state and an off state. When the switching element 34U is turned on, current flows from the positive electrode of the power source 90 to the negative electrode of the power source 90 through the high-potential input wiring 12, the reactor 30U, the switching element 34U, and the low-potential wiring 16. After this, when the switching element 34U is turned off, the reactor 30U generates electromotive force in a direction keeping the current flowing, so a potential of the anode of the diode 32U rises. Consequently, current flows from the positive electrode of the power source 90 to the capacitor 20 through the high-potential input wiring 12, the reactor 30, the diode 32U, and the high-potential output wiring 14. The capacitor 20 is thereby charged, and a potential of the high-potential output wiring 14 rises. By repeatedly turning on and off the switching element 34, the capacitor 20 is charged continuously and the potential of the high-potential output wiring 14 is controlled to be a high potential.

As described above, the boosting operations of the boost circuits V, W, X are identical to the boosting operation of the boost circuit U. Hereinafter, allowing current to flow in the reactor 30, the diode 32, and the switching element 34 by periodically switching the switching element 34 will be referred to as energizing the boost circuit. The control substrate 24 can control the boost circuits U, V, W, X independently.

As described above, when the capacitor 20 is charged (when current flows in the diode 32), the current I1 supplied from the power source 90 flows in the capacitor 20. Therefore, the current I1 at the charging of the capacitor 20 is approximately equal to a charge current I2 that flows in the capacitor 20.

The control substrate 24 can perform an operation A, an operation B, an operation C, and an operation D. When ignition is turned on, the control substrate 24 selects any one of the operations A to D and starts it. The control substrate 24 keeps performing the selected operation until the ignition is turned off. When the ignition is turned on the next time, the control substrate 24 selects another operation out of the operations A to D and starts it. As such, the control substrate 24 changes the operation to perform among the operations A to D, each time the ignition is turned on. The control substrate 24 performs the operation A, the operation B, the operation C, and the operation D in this order one by one, and performs the operation A again after the operation D. In other words, the control substrate 24 performs the operation A, the operation B, the operation C, and the operation D in rotation. In each of the operation A, the operation B, the operation C, and the operation D, the control substrate 24 controls the boost circuits U, V, W, X such that a number of the boost circuits to be energized is increased as the current I1 detected by the current sensor 22 (i.e., the charge current I2) is larger.

The microcomputer 26 in the control substrate 24 stores a control method shown in FIG. 4. FIG. 4 shows details of the operation A, the operation B, the operation C, and the operation D. The control substrate 24 controls each of the boost circuits in accordance with the control method shown in FIG. 4.

In the operation A, the control substrate 24 firstly detects the current I1. The control substrate 24 then changes the boost circuit(s) to be energized, in accordance with a magnitude of the current I1.

If the detected current I1 is less than a threshold Ith1, the control substrate 24 energizes the boost circuit U and does not energize the boost circuits W, V, X. Therefore, only the boost circuit U performs the boosting operation, and the capacitor 20 is charged thereby.

If the detected current I1 is equal to or greater than the threshold Ith and less than a threshold Ith2, the control substrate 24 energizes the boost circuits U, W and does not energize the boost circuits V, X. Therefore, the boost circuits U, W perform the boosting operations, and the capacitor 20 is charged thereby. At this occasion, switching periodicity and phase may be the same or different between the switching elements 34U, 34W. For example, the switching element 34U and the switching element 34W may be switched with the same periodicity and in reverse phases.

If the detected current I1 is equal to or greater than the threshold Ith2 and less than a threshold Ith3, the control substrate 24 energizes the boost circuits U, W, V and does not energize the boost circuit X. Therefore, the boost circuits U, W, V perform the boosting operations, and the capacitor 20 is charged thereby. At this occasion, switching periodicity and phase may be the same or different among the switching elements 34U, 34W, 34V.

If the detected current I1 is equal to or greater than the threshold Ith3, the control substrate 24 energizes all of the boost circuits U, W, V, X. Therefore, the boost circuits U, W, V, X perform the boosting operations, and the capacitor 20 is charged thereby. At this occasion, switching periodicity and phase may be the same or different among the switching elements 34U, 34W, 34V, 34X.

In the operation A, the control substrate 24 repeatedly perform, with a constant periodicity, detection of the current I1 and energization of the boost circuit(s) in accordance with the detected current I1. Therefore, an appropriate number of the boost circuits in accordance with the current I1 perform the boosting operation(s).

As described above, in the operation A, the number of the boost circuits to be energized is increased as the current I1 becomes larger. Therefore, when the current I1 is large, the current I1 is distributed to the plurality of boost circuits and flows therethrough such that current that flows in each of the boost circuits is controlled not to exceed its allowable current. This prevents excessive temperature rise in a specific boost circuit. Moreover, when current flows in the reactor 30, a certain degree of loss is generated even in a case where a value of the current is small. Therefore, when the current I1 is small, decreasing the number of the boost circuits to be energized (i.e., the number of the reactors 30 in which current flows), as in the operation A mentioned above, can reduce loss to be generated. As described above, by increasing the number of the boost circuits to be energized as the current I1 (i.e., the current I2) is larger, excessive temperature rise can be prevented in each of the boost circuits, while loss to be generated therein is reduced.

In the operation B as well, each of the boost circuits U, V, W, X is controlled such that the number of the boost circuits to be energized is increased as the current I1 becomes larger. In the operation B, the boost circuit W is energized when current is low (I1<Ith1), the boost circuits W, U are energized when current is relatively low (Ith1≤I1<Ith2), the boost circuits W, U, X are energized when current is relatively high (Ith2≤I1<Ith3), and the boost circuits W, U, X, V are energized when current is high (Ith3≤I1).

In the operation C as well, each of the boost circuits U, V, W, X is controlled such that the number of the boost circuits to be energized is increased as the current I1 becomes larger. In the operation C, the boost circuit V is energized when current is low (I1<Ith1), the boost circuits V, X are energized when current is relatively low (Ith1≤I1<Ith2), the boost circuits V, X, U are energized when current is relatively high (Ith2≤I1<Ith3), and the boost circuits V, X, U, W are energized when current is high (Ith3≤I1).

In the operation D as well, each of the boost circuits U, V, W, X is controlled such that the number of the boost circuits to be energized is increased as the current I1 becomes larger. In the operation D, the boost circuit X is energized when current is low (I1<Ith1), the boost circuits X, V are energized when current is relatively low (Ith1≤I1<Ith2), the boost circuits X, V, W are energized when current is relatively high (Ith2≤I1<Ith3), and the boost circuits X, V, W, U are energized when current is high (Ith3≤I1).

As described above, in the operation B, the operation C, and the operation D as well, the number of the boost circuits to be energized is increased as the current I1 becomes larger, so excessive temperature rise in each of the boost circuits can be prevented while loss to be generated therein is reduced.

Moreover, in the operation A, the boost circuit U and the boost circuit W are energized when $Ith1 \leq I1 < Ith2$. In other words, current flows in the switching module 40U and the switching module 40W shown in FIG. 3. Between the switching module 40U and the switching module 40W, the switching module 40V in which no current flows exists. Therefore, heat is generated in a distributed manner in the power control unit 50, and the generated heat is easily dissipated. Due to this, temperature rise in the switching elements 34U, 34W is suppressed. In the operation B, the operation C, and the operation D as well, as shown in FIG. 4, current does not flow in the adjacent switching modules 40 when $Ith1 \leq I1 < Ith2$. Therefore, in the operation B, the operation C, and the operation D as well, temperature rise in the switching elements 34 is suppressed when $Ith1 \leq I1 < Ith2$.

Next, an energizing frequency of each of the boost circuits U, V, W, X will be described. In the operation A, as shown in FIG. 4, the boost circuit U is constantly energized, and thus it has a highest energizing frequency. In the operation B, the boost circuit U is energized when $Ith1 \leq I1$, and thus it has a second highest energizing frequency. In the operation C, the boost circuit U is energized when $Ith2 \leq I1$, and thus it has a third highest energizing frequency. In the operation D, the boost circuit U is energized only when $Ith3 \leq I1$, and thus it has a lowest energizing frequency. As such, in the operations A to D, the boost circuit U has different energizing frequencies, respectively. Similarly, the energizing frequency of the boost circuit V is the highest in the operation C, the second highest in the operation D, the third highest in the operation A, and the lowest in the operation B. The energizing frequency of the boost circuit W is the highest in the operation B, the second highest in the operation A, the third highest in the operation D, and the lowest in the operation C. The energizing frequency of the boost circuit X is the highest in the operation D, the second highest in the operation C, the third highest in the operation B, and the lowest in the operation A. As described above, the control substrate 24 performs the operations A to D in rotation. Therefore, the energizing frequencies of the boost circuits U, V, W, X are averaged. The energizing frequency of a specific boost circuit can thereby be prevented from becoming outstandingly higher than the energizing frequencies of the other boost circuits. In other words, the energizing frequency of the specific switching element 34 can be prevented from becoming outstandingly higher than the energizing frequencies of the other switching elements 34. The load is averaged among the switching elements 34U, 34V, 34W, 34X. Due to this, the specific switching element 34 can be suppressed from deteriorating extremely earlier than the other switching elements 34. Lifetime of the boost converter 10, as a whole, can thereby be prolonged.

In the embodiment described above, as shown in FIG. 4, the energizing frequencies of the boost circuits U, V, W, X are approximately uniformized among the operations A to D. However, at least as long as a certain boost circuit does not have the highest energizing frequency more than once throughout the operations A to D, the certain boost circuit may have the second highest energizing frequency, the third highest energizing frequency, or the lowest energizing frequency more than once throughout the operations A to D.

Moreover, although the boost converter includes the four boost circuits in the embodiment described above, the number of the boost circuits may be larger or smaller than four.

Moreover, although any one of the operations A to D is selected when the ignition is turned on and performed in the embodiment described above, the operation to be performed may be changed among the operations A to D at another timing.

In the embodiment described above, the current I1 that flows in the high-potential input wiring 12 is detected, and the number of the boosts circuits to be energized is changed based on the detected current I1. However, the current I2 that flows in the capacitor 20 may be detected, and the number of the boost circuits to be energized may be changed based on the detected current I2. Moreover, the number of the boost circuits to be energized may be changed in accordance with current in another portion (current correlated with the current I2).

Relationships between the constituent elements in the embodiment and constituent elements in the claims will hereinafter be described. The operation A in the embodiment is an example of a first operation in the claims. The operation D in the embodiment is an example of a second operation in the claims. The operation B in the embodiment is an example of a third operation in the claims. The boost circuit U in the embodiment is an example of a first boost circuit, an eighth boost circuit, and a tenth boost circuit in the claims. The boost circuit W in the embodiment is an example of a second boost circuit, a sixth boost circuit, and a ninth boost circuit in the claims. The boost circuit V in the embodiment is an example of a fourth boost circuit and a fifth boost circuit in the claims. The boost circuit X in the embodiment is an example of a third boost circuit and a seventh boost circuit in the claims. The control substrate 24 in the embodiment is an example of a control circuit in the claims.

Some of the technical features disclosed herein will be listed below. It should be noted that the respective technical elements are independent of one another, and are useful solely or in combinations.

In an example of boost converter disclosed herein, the second boost circuit may be one of the plurality of boost circuits other than the fourth boost circuit.

According to this configuration, the load on each of the switching elements can be more effectively distributed.

In an example of boost converter disclosed herein, the control circuit may be configured, in the first operation, to energize the first boost circuit, the second boost circuit, and a fifth boost circuit of the plurality of boost circuits when the charge current is in a third range, and the charge current in the third range may be larger than the charge current in the second range. The control circuit may be configured, in the second operation, to energize the third boost circuit, the fourth boost circuit, and a sixth boost circuit of the plurality of boost circuits when the charge current is in the third range. The fifth boost circuit may be one of the plurality of boost circuits other than the sixth boost circuit. It should be noted that "the charge current in the third range may be larger than the charge current in the second range" means that a lower limit of the third range is larger than an upper limit of the second range.

According to this configuration, boosting by three or more boost circuits can be achieved while the load on each of the switching elements is distributed.

In an example of boost converter disclosed herein, the switching elements of the boost circuits may be arranged in line. In the line of the switching elements, one of the switching elements other than a first switching element of the first boost circuit and a second switching element of the second boost circuit may be located between the first switching element and the second switching element. In the line of the switching elements, one of the switching elements other than a third switching element of the third boost circuit and a fourth switching element of the fourth boost circuit may be located between the third switching element and the fourth switching element.

According to this configuration, when the charge current is in the second range in the first operation, current flows in the switching element in the first boost circuit and the switching element in the second boost circuit which are disposed with spacing therebetween. In other words, the current can be prevented from flowing in the switching elements adjacent to each other. Due to this, temperature rise in the switching elements can be suppressed. Similarly, when the charge current is in the second range in the second operation, current flows in the switching element in the third boost circuit and the switching element in the fourth boost circuit which are disposed with spacing therebetween. Due to this, temperature rise in the switching elements can be suppressed.

In an example of boost converter disclosed herein, the control circuit may be configured, in the first operation, to energize the first boost circuit, the second boost circuit, the fifth boost circuit, and a seventh boost circuit of the plurality of boost circuits when the charge current is in a fourth range, and the charge current in the fourth range may be larger than the charge current in the third range. The control circuit may be configured, in the second operation, to energize the third boost circuit, the fourth boost circuit, the sixth boost circuit, and an eighth boost circuit of the plurality of boost circuits when the charge current is in the fourth range. The seventh boost circuit may be one of the plurality of boost circuits other than the eighth boost circuit. It should be noted that "the charge current in the fourth range may be larger than the charge current in the third range" means that a lower limit of the fourth range is larger than an upper limit of the third range.

According to this configuration, boosting by four or more boost circuits can be achieved while the load on each of the switching elements is distributed.

In an example of boost converter disclosed herein, a total number of the plurality of boost circuits may be four. The first boost circuit may be the eighth boost circuit, the second boost circuit may be the sixth boost circuit, the fifth boost circuit may be the fourth boost circuit, and the seventh boost circuit may be the third boost circuit.

According to this configuration, the load on each of the switching elements can be more effectively distributed.

In an example of boost converter disclosed herein, the control circuit may be configured to be capable of performing a third operation. The control circuit may be configured, in the third operation, to energize a ninth boost circuit of the plurality of boost circuits when the charge current is in the first range and energize the ninth boost circuit and a tenth boost circuit of the plurality of boost circuits when the charge current is in the second range. The ninth boost circuit may be one of the plurality of boost circuits other than the first boost circuit and the third boost circuit.

According to this configuration, by performing the first to third operations, the load on each of the switching elements can further be distributed.

While specific examples of the present disclosure have been described above in detail, these examples are merely illustrative and place no limitation on the scope of the present disclosure. The technology described in the present disclosure also encompasses various changes and modifications to the specific examples described above. The technical elements explained in the present description or drawings provide technical utility either independently or through various combinations. The present disclosure is not limited to the combinations described at the time the present disclosure are filed. Further, the purpose of the examples illustrated by the present description or drawings is to satisfy multiple objectives simultaneously, and satisfying any one of those objectives gives technical utility to the present disclosure.

What is claimed is:

1. A boost converter configured to boost voltage supplied from a power source, the boost converter comprising:
   a high-potential input wiring connected to a positive electrode of the power source:
   a low-potential wiring connected to a negative electrode of the power source;
   a high-potential output wiring;
   a capacitor connected between the high-potential output wiring and the low-potential wiring;
   a plurality of boost circuits; and
   a control circuit,
   wherein
   each of the plurality of boost circuits comprises:
   a diode, a cathode of the diode being connected to the high-potential output wiring;
   a switching element comprising a first main terminal connected to an anode of the diode, a second main terminal connected to the low-potential wiring, and a gate; and
   a reactor connected between the high-potential input wiring and the anode of the diode:
   the control circuit is connected to the gates of the switching elements of the plurality of boost circuits,
   the control circuit is configured to be capable of performing a first operation and a second operation,
   the control circuit is configured, in each of the first operation and the second operation, to increase a number of the boost circuits to be energized as charge current charging the capacitor is larger,
   the control circuit is configured, in the first operation, to energize a first boost circuit of the plurality of boost circuits when the charge current is in a first range, and energize the first boost circuit and a second boost circuit of the plurality of boost circuits when the charge current is in a second range, the charge current in the second range being larger than the charge current in the first range,
   the control circuit is configured, in the second operation, to energize a third boost circuit of the plurality of boost circuits when the charge current is in the first range, and energize the third boost circuit and a fourth boost circuit of the plurality of boost circuits when the charge current is in the second range, and
   the first boost circuit is one of the plurality of boost circuits other than the third boost circuit.

2. The boost converter of claim 1, wherein the second boost circuit is one of the plurality of boost circuits other than the fourth boost circuit.

3. The boost converter of claim 1, wherein
   the control circuit is configured, in the first operation, to energize the first boost circuit, the second boost circuit, and a fifth boost circuit of the plurality of boost circuits when the charge current is in a third range, the charge current in the third range being larger than the charge current in the second range, the control circuit is configured, in the second operation, to energize the third boost circuit, the fourth boost circuit, and a sixth boost circuit of the plurality of boost circuits when the charge current is in the third range, and the fifth boost circuit is one of the plurality of boost circuits other than the sixth boost circuit.

4. The boost converter of claim 3, wherein the switching elements of the boost circuits are arranged in line, in the line of the switching elements, one of the switching elements other than a first switching element of the first boost circuit and a second switching element of the second boost circuit is located between the first switching element and the second switching element, and in the line of the switching elements, one of the switching elements other than a third switching element of the third boost circuit and a fourth switching element of the fourth boost circuit is located between the third switching element and the fourth switching element.

5. The boost converter of claim 3, wherein the control circuit is configured, in the first operation, to energize the first boost circuit, the second boost circuit, the fifth boost circuit, and a seventh boost circuit of the plurality of boost circuits when the charge current is in a fourth range, the charge current in the fourth range being larger than the charge current in the third range, the control circuit is configured, in the second operation, to energize the third boost circuit, the fourth boost circuit, the sixth boost circuit, and an eighth boost circuit of the plurality of boost circuits when the charge current is in the fourth range, and the seventh boost circuit is one of the plurality of boost circuits other than the eighth boost circuit.

6. The boost converter of claim 5, wherein a total number of the plurality of boost circuits is four, the first boost circuit is the eighth boost circuit, the second boost circuit is the sixth boost circuit, the fifth boost circuit is the fourth boost circuit, and the seventh boost circuit is the third boost circuit.

7. The boost converter of claim 1, wherein the control circuit is configured to be capable of performing a third operation, the control circuit is configured, in the third operation, to energize a ninth boost circuit of the plurality of boost circuits when the charge current is in the first range and energize the ninth boost circuit and a tenth boost circuit of the plurality of boost circuits when the charge current is in the second range, the ninth boost circuit is one of the plurality of boost circuits other than the first boost circuit and the third boost circuit.

\* \* \* \* \*

UNITED STATES PATENT AND TRADEMARK OFFICE
CERTIFICATE OF CORRECTION

PATENT NO. : 10,439,498 B2  
APPLICATION NO. : 16/284639  
DATED : October 8, 2019  
INVENTOR(S) : Manabu Uehara Page 1 of 1

It is certified that error appears in the above-identified patent and that said Letters Patent is hereby corrected as shown below:

In the Specification

In Column 5, Line 59, after "Ith" insert --1--.

In the Claims

In Column 10, Claim 1, Line 18, after "source", delete ":" and insert --;--, therefor.

Signed and Sealed this
Twenty-fourth Day of December, 2019

Andrei Iancu
*Director of the United States Patent and Trademark Office*